US008625924B2

(12) United States Patent
Tanaka et al.

(10) Patent No.: US 8,625,924 B2
(45) Date of Patent: Jan. 7, 2014

(54) IMAGE DEBLOCKING BASED ON COMPLEXITY

(75) Inventors: Junichi Tanaka, Kanagawa (JP); Kazushi Sato, Kanagawa (JP); Yoichi Yagasaki, Tokyo (JP); Kazuhiro Ishigaya, Tokyo (JP)

(73) Assignee: Sony Corporation, Tokyo (JP)

( * ) Notice: Subject to any disclaimer, the term of this patent is extended or adjusted under 35 U.S.C. 154(b) by 1149 days.

(21) Appl. No.: 12/373,623

(22) PCT Filed: Jul. 13, 2007

(86) PCT No.: PCT/JP2007/063948
§ 371 (c)(1),
(2), (4) Date: Jan. 13, 2009

(87) PCT Pub. No.: WO2008/007757
PCT Pub. Date: Jan. 17, 2008

(65) Prior Publication Data
US 2009/0263032 A1    Oct. 22, 2009

(30) Foreign Application Priority Data
Jul. 14, 2006    (JP) .............................. P2006-193671

(51) Int. Cl.
  *G06K 9/36*  (2006.01)
  *G06K 9/40*  (2006.01)

(52) U.S. Cl.
  USPC .......................................... 382/268; 382/232

(58) Field of Classification Search
  USPC .................................................. 382/268, 232
  See application file for complete search history.

(56) References Cited

U.S. PATENT DOCUMENTS

| 5,229,864 | A | * | 7/1993 | Moronaga et al. ............ 382/261 |
| 5,543,848 | A | | 8/1996 | Murakami et al. |
| 5,657,015 | A | * | 8/1997 | Nakajima et al. ............... 341/61 |
| 6,041,145 | A | | 3/2000 | Hayashi et al. |
| 6,064,776 | A | * | 5/2000 | Kikuchi et al. ............... 382/260 |
| 7,050,504 | B2 | * | 5/2006 | Joch et al. ................. 375/240.26 |
| 2002/0118399 | A1 | * | 8/2002 | Estevez et al. ........... 358/426.07 |
| 2003/0053708 | A1 | * | 3/2003 | Kryukov et al. .............. 382/261 |
| 2004/0208392 | A1 | * | 10/2004 | Raveendran et al. ......... 382/268 |
| 2004/0247034 | A1 | * | 12/2004 | Zhong et al. ............. 375/240.29 |
| 2005/0024651 | A1 | * | 2/2005 | Yu et al. ........................ 358/1.9 |
| 2005/0100241 | A1 | * | 5/2005 | Kong et al. ................... 382/268 |
| 2005/0152450 | A1 | * | 7/2005 | Ueno et al. ............... 375/240.03 |
| 2005/0265623 | A1 | * | 12/2005 | Estevez et al. ............... 382/268 |
| 2005/0276505 | A1 | * | 12/2005 | Raveendran .................. 382/268 |
| 2006/0013299 | A1 | * | 1/2006 | Sato et al. ................ 375/240.03 |

(Continued)

FOREIGN PATENT DOCUMENTS

AU    5186293    7/1994
BR    406808    12/2005

(Continued)

*Primary Examiner* — Wenpeng Chen
(74) *Attorney, Agent, or Firm* — Frommer Lawrence & Haug LLP; William S. Frommer (57) ABSTRACT

An image processing apparatus capable of improving image quality, includes a deblocking filter that adjusts a plurality of parameters related to deblocking processing on the basis of activity of an image calculated by an activity calculation section, the total sum of orthogonal transformation coefficients of the image calculated by an orthogonal transformation section, complexity of the image calculated by the rate control unit, or the total sum of prediction errors of the image calculated by a prediction error addition unit.

10 Claims, 5 Drawing Sheets

(56) References Cited

U.S. PATENT DOCUMENTS

| | | | |
|---|---|---|---|
| 2006/0104349 A1* | 5/2006 | Joch et al. | 375/240.03 |
| 2006/0104357 A1* | 5/2006 | Burazerovic et al. | 375/240.15 |
| 2006/0110056 A1* | 5/2006 | Gambhire | 382/233 |
| 2006/0257044 A1* | 11/2006 | Chiu | 382/261 |
| 2006/0294171 A1* | 12/2006 | Bossen et al. | 708/300 |
| 2007/0189392 A1* | 8/2007 | Tourapis et al. | 375/240.21 |
| 2007/0223575 A1* | 9/2007 | Wang et al. | 375/240.1 |
| 2009/0074070 A1* | 3/2009 | Yin et al. | 375/240.16 |
| 2009/0080535 A1* | 3/2009 | Yin et al. | 375/240.26 |
| 2009/0207919 A1* | 8/2009 | Yin et al. | 375/240.25 |
| 2010/0158110 A1* | 6/2010 | Pandit et al. | 375/240.12 |
| 2011/0110427 A1* | 5/2011 | Teng et al. | 375/240.16 |

FOREIGN PATENT DOCUMENTS

| | | |
|---|---|---|
| BR | 0406808 | 12/2005 |
| CN | 1739298 | 2/2006 |
| EP | 603878 | 6/1994 |
| EP | 0 772 365 | 5/1997 |
| EP | 1588565 | 10/2005 |
| JP | 02 235491 | 9/1990 |
| JP | 6 38197 | 2/1994 |
| JP | 6 311506 | 11/1994 |
| JP | 9 187008 | 7/1997 |
| JP | 10 66082 | 3/1998 |
| JP | 3489735 | 11/2003 |
| JP | 2006 517362 | 7/2006 |
| WO | WO 2004 066634 | 8/2004 |

* cited by examiner

IMAGE DEBLOCKING BASED ON COMPLEXITY

TECHNICAL FIELD

The present invention relates to an image processing apparatus, method, and program, and to an image processing apparatus, method, and program that are capable of improving image quality.

BACKGROUND ART

A factor that causes degradation in the image quality of images encoded by an MPEG-2 (Moving Picture Experts Group phase 2) method is block noise. Thus, in an apparatus that encodes images by an MPEG-4 (Moving Picture Experts Group phase 4) method or an H.264/AVC (Advanced Video Coding) method, a deblocking filter that performs deblocking processing for removing block noise is provided (for example, see Patent Document 1). By such deblocking processing, even for, in particular, images at low bit rates, degradation in the image quality can be suppressed.
Patent Document 1: Japanese Patent No. 3489735

DISCLOSURE OF INVENTION

Technical Problem

However, since in deblocking processing, low-pass filtering processing is performed for boundaries between blocks, there is a problem in that block noise can be removed whereas detailed information on the design and the like (hereinafter, also referred to as texture) of an image is lost.

The present invention has been designed in view of the above-described circumstances and aims to improve image quality by performing deblocking processing properly.

Technical Solution

An image processing apparatus according to an aspect of the present invention includes a deblocking filter that performs deblocking processing on a decoded image obtained by decoding a second image that is used for motion estimation of a first image in a case where the first image is encoded and that is encoded prior to the first image, and feature quantity calculation means for calculating a feature quantity representing the complexity of the second image. The deblocking filter controls whether or not the deblocking processing is to be applied to the decoded image or controls the degree to which the deblocking processing is to be applied to the decoded image, on the basis of the feature quantity.

The feature quantity calculation means can calculate the coding difficulty of the second image as the feature quantity.

In a case where the second image is an image encoded by using inter-frame prediction, the feature quantity calculation means can set, as the feature quantity, a value obtained by normalizing the coding difficulty of the second image by using the coding difficulty of a third image encoded by using intra-frame prediction prior to the encoding of the second image.

The feature quantity calculation means can divide the second image that has not been encoded into a plurality of blocks, and calculate the feature quantity on the basis of dispersion of pixel values for each of the blocks.

The feature quantity calculation means can divide the second image that has not been encoded into a plurality of blocks, and calculate the feature quantity on the basis of a transformation coefficient obtained by performing orthogonal transformation for each of the blocks.

The feature quantity calculation means can calculate the feature quantity on the basis of a prediction error, which is a difference between a predicted image for the second image predicted by inter-frame prediction and the second image that has not been encoded.

The image processing apparatus can encode an image by an H.264/AVC (Advanced Video Coding) method. The deblocking filter can control whether or not the deblocking processing is to be applied to the decoded image or control the degree to which the deblocking processing is to be applied to the decoded image by adjusting a value of disable_deblocking_filter_idc, slice_alpha_c0_offset_div2, or slice_beta_offset_div2.

The image processing apparatus can encode an image by an MPEG-4 (Moving Picture Coding Experts Group phase 4), H.264/AVC (Advanced Video Coding), or VC-1(Video Codec 1) method.

An image processing method or program according to an aspect of the present invention includes the steps of calculating a feature quantity representing the complexity of a second image that is used for motion estimation of a first image in a case where the first image is encoded and that is encoded prior to the first image, and controlling whether or not deblocking processing is to be applied to a decoded image obtained by decoding the second image or controlling the degree to which the deblocking processing is to be applied to the decoded image, on the basis of the feature quantity.

In an aspect of the present invention, a feature quantity representing the complexity of a second image that is used for motion estimation of a first image in a case where the first image is encoded and that is encoded prior to the first image is calculated, and control of whether or not deblocking processing is to be applied to a decoded image obtained by decoding the second image or control of the degree to which the deblocking processing is to be applied to the decoded image is performed on the basis of the feature quantity.

Advantageous Effects

According to an aspect of the present invention, deblocking processing can be performed properly in accordance with the feature of an image. In addition, according to an aspect of the present invention, image quality can be improved.

EXPLANATION OF REFERENCE NUMERALS 101 image processing apparatus, 113 feature quantity calculation unit, 114 adder, 115 orthogonal transformation unit, 119 rate control unit, 120 prediction error addition unit, 124 deblocking filter, 126 intra-prediction unit, 127 motion estimation and compensation unit, 141 activity calculation section, 142 orthogonal transformation section

BEST MODES FOR CARRYING OUT THE INVENTION

Hereinafter, embodiments of the present invention will be described with reference to the drawings.

Figure 1:
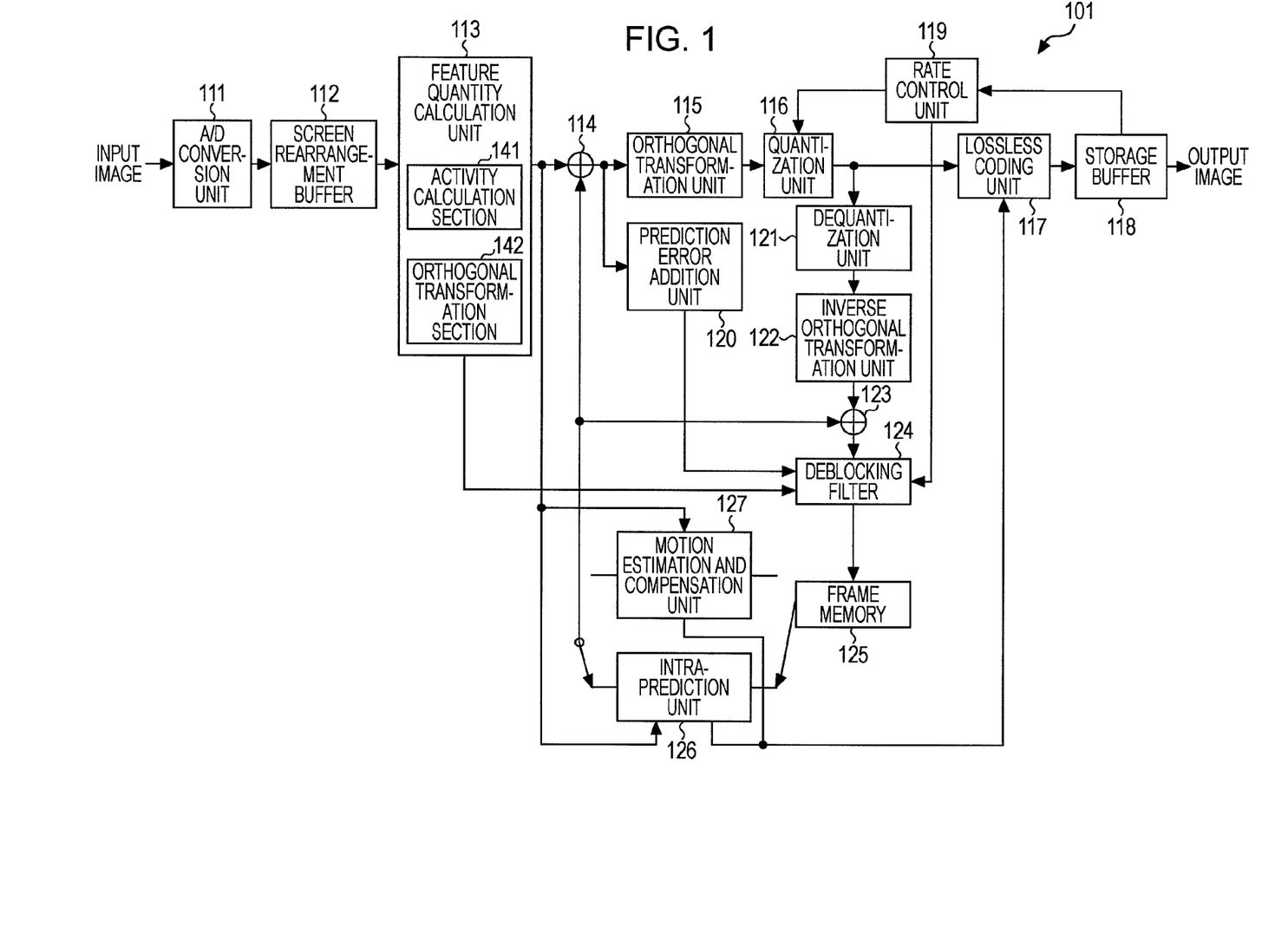
FIG. 1 is a block diagram showing an embodiment of an image processing apparatus to which the present invention is applied.

FIG. 1 is a block diagram showing the configuration of an embodiment of an image processing apparatus to which the present invention is applied.

An image processing apparatus 101 is an apparatus for encoding an input image by an H.264/AVC (Advanced Video Coding) method and outputting the encoded image to, for example, a recording apparatus or a transmission path, which is not illustrated, in the subsequent stage.

The image processing apparatus 101 is configured to include an A/D (Analog/Digital) conversion unit 111, a screen rearrangement buffer 112, a feature quantity calculation unit 113, an adder 114, an orthogonal transformation unit 115, a quantization unit 116, a lossless coding unit 117, a storage buffer 118, a rate control unit 119, a prediction error addition unit 120, a dequantization unit 121, an inverse orthogonal transformation unit 122, an adder 123, a deblocking filter 124, a frame memory 125, an intra-prediction unit 126, and a motion estimation and compensation unit 127. In addition, the feature quantity calculation unit 113 is configured to include an activity calculation section 141 and an orthogonal transformation section 142.

The A/D conversion unit 111 analog-to-digital converts an analog image input from the outside into a digital image, and supplies the converted digital image (hereinafter, also referred to as an original image, where appropriate) to the screen rearrangement buffer 112.

The screen rearrangement buffer 112 rearranges original images supplied from the A/D conversion unit 111 on the basis of a GOP (Group Of Pictures) structure, and sequentially supplies the original images to the feature quantity calculation unit 113.

The feature quantity calculation unit 113 calculates a feature quantity representing the complexity of an original image. In addition, the feature quantity calculation unit 113 supplies, to the adder 114, the intra-prediction unit 126, and the motion estimation and compensation unit 127, the original image for which calculation of the feature quantity has been completed.

Figure 4:
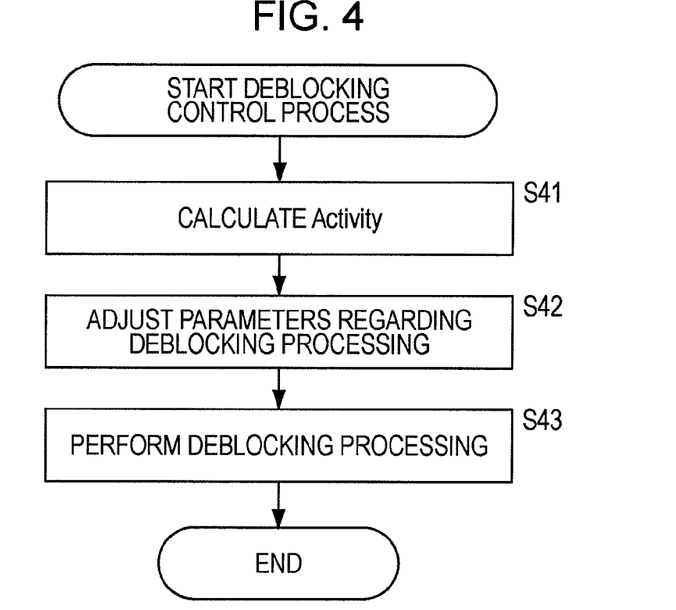
FIG. 4 is a flowchart for explaining a second embodiment of a deblocking control process performed by the image processing apparatus in FIG. 2.

Among the elements constituting the feature quantity calculation unit 113, the activity calculation section 141 divides an original image into a plurality of blocks, and calculates the feature quantity of the original image on the basis of dispersion of pixel values for each block, as described later with reference to FIG. 4. The activity calculation section 141 supplies information indicating the calculated feature quantity to the deblocking filter 124.

Figure 5:
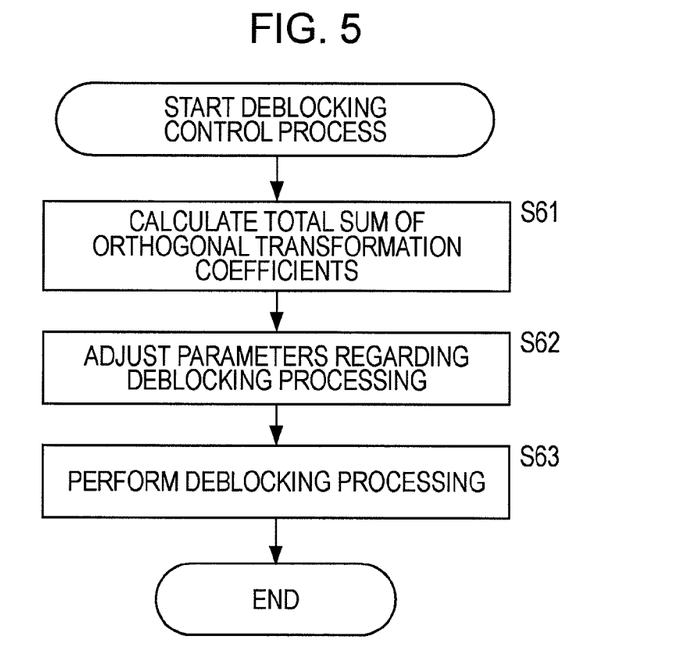
FIG. 5 is a flowchart for explaining a third embodiment of a deblocking control process performed by the image processing apparatus in FIG. 3.

In addition, as described later with reference to FIG. 5, the orthogonal transformation section 142 divides an original image into a plurality of blocks, and calculates the feature quantity of the original image on the basis of a transformation coefficient obtained by performing orthogonal transformation for each of the blocks. The orthogonal transformation section 142 supplies information indicating the calculated feature quantity to the deblocking filter 124.

For each macroblock, the adder 114 obtains, from the intra-prediction unit 126 or the motion estimation and compensation unit 127, one of an intra-predicted image predicted by using intra prediction (intra-frame prediction) and an inter-predicted image predicted by using inter prediction (inter-frame prediction, motion compensation prediction) for an original image. The adder 114 calculates, for each macroblock, a difference between the original image and the intra-predicted image or the inter-predicted image, and supplies, to the orthogonal transformation unit 115 and the prediction error addition unit 120, a difference image formed from prediction errors obtained by calculation of the difference.

The orthogonal transformation unit 115 performs orthogonal transformation, such as discrete cosine transform or Karhunen-Loeve transform, on a difference image for each block having a predetermined size, and supplies the thus obtained transformation coefficients to the quantization unit 116.

The quantization unit 116 quantizes the transformation coefficients supplied from the orthogonal transformation unit 115 by using quantizer scales controlled by the rate control unit 119, and supplies the quantized transformation coefficients to the lossless coding unit 117 and the dequantization unit 121.

The lossless coding unit 117 obtains information on intra prediction from the intra-prediction unit 126 and obtains information on inter prediction from the motion estimation and compensation unit 127. The lossless coding unit 117 arranges quantized transformation coefficients, information on intra prediction, information on inter prediction, and the like in a predetermined order, and performs lossless coding processing, such as variable-length coding such as CAVLC (Context-Adaptive Variable Length Coding) or arithmetic coding such as CABAC (Context-Adaptive Binary Arithmetic Coding), on the arranged data. The lossless coding unit 117 supplies the encoded data to the storage buffer 118 to be stored therein.

The storage buffer 118 outputs, as an image encoded by the H.264/AVC method, data supplied from the lossless coding unit 117, for example, to a recording apparatus or a transmission path, which is not illustrated, in the subsequent stage.

The rate control unit 119 controls, on the basis of the code amount of an image stored in the storage buffer 118, a bit rate, which is the code amount per time assigned to an image to be encoded.

For example, the rate control unit 119 controls, by using a rate control method defined by MPEG-2 TestModel 5 (TM5), the bit rate by controlling the value of a quantizer scale, which is a value dividing a transformation coefficient when the quantization unit 116 performs quantization. In addition, as described later with reference to FIG. 3, the rate control unit 119 calculates the coding difficulty as the feature quantity representing the complexity of an original image, and supplies the calculated coding difficulty to the deblocking filter 124.

Figure 6:
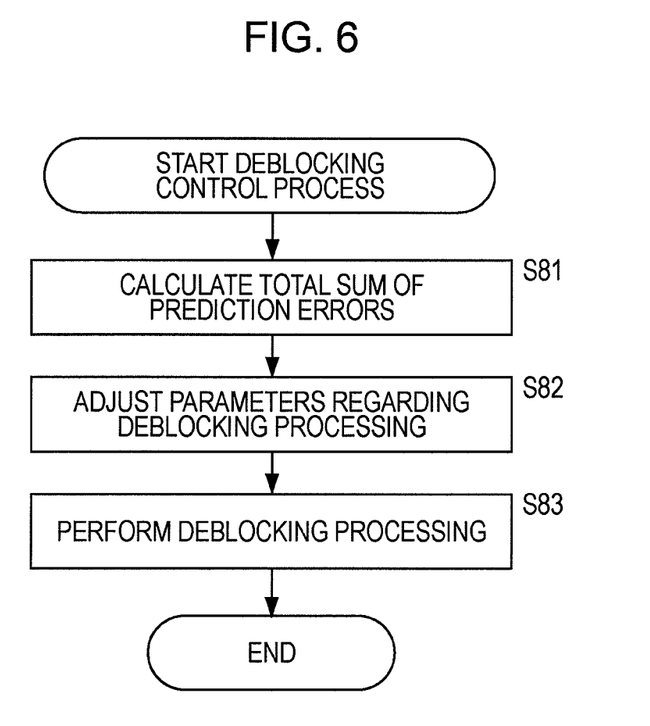
FIG. 6 is a flowchart for explaining a fourth embodiment of a deblocking control process performed by the image processing apparatus in FIG. 4.

The prediction error addition unit 120 calculates, as described later with reference to FIG. 6, the feature quantity representing the complexity of an image on the basis of prediction errors forming a difference image supplied from the adder 114. The prediction error addition unit 120 supplies information indicating the calculated feature quantity to the deblocking filter 124.

The dequantization unit 121 dequantizes transformation coefficients supplied from the quantization unit 116 and supplies the dequantized transformation coefficients to the inverse orthogonal transformation unit 122.

The inverse orthogonal transformation unit 122 performs inverse orthogonal transformation, such as inverse discrete cosine transform or inverse Karhunen-Loeve transform, on the transformation coefficients supplied from the dequantization unit 121. Thus, a difference image is obtained by decoding. The inverse orthogonal transformation unit 122 supplies the decoded difference image to the adder 123.

The adder 123 obtains, from the intra-prediction unit 126 or the motion estimation and compensation unit 127, an intra-predicted image or an inter-predicted image that has been used for generation of a difference image, and adds the difference image and the obtained intra-predicted image or inter-predicted image together. Thus, an original image is obtained by decoding. The adder 123 supplies the decoded image (hereinafter, referred to as a decoded image, where appropriate) to the deblocking filter 124.

The deblocking filter 124 performs deblocking processing for removing block noise on a decoded image. Note that, as described later with reference to FIGS. 3 to 6, the deblocking filter 124 controls whether or not deblocking processing is to be applied to the decoded image or controls the degree to which the deblocking processing is to be applied to the decoded image, on the basis of the feature quantity obtained from the rate control unit 119, the prediction error addition unit 120, the activity calculation section 141, or the orthogonal transformation section 142. The deblocking filter 124 supplies a decoded image that has been subjected to deblocking processing to the frame memory 125. In addition, the deblocking filter 124 directly supplies, as an image to be used for intra prediction, a decoded image that has not been subjected to deblocking processing, to the frame memory 125.

The frame memory 125 stores, as an image to be referred to in a case where intra prediction or inter prediction is performed (hereinafter, referred to as a reference image, where appropriate), a decoded image supplied from the deblocking filter 124.

The intra-prediction unit 126 performs, for each macroblock, by using an encoded pixel adjacent to the corresponding macroblock within the same frame stored in the frame memory 125, intra prediction for generating a predicted image for an original image. Note that, as described above, a pixel of a decoded image that has not been subjected to deblocking processing is used for intra prediction.

The motion estimation and compensation unit 127 detects, for each macroblock, by using a reference image in a different frame stored in the frame memory 125, a motion vector of an original image with respect to the reference image, and performs motion compensation on the reference image by using the detected motion vector. Accordingly, the motion estimation and compensation unit 127 performs inter prediction for generating an inter-predicted image for the original image.

In addition, a prediction mode to be applied to each macroblock is determined, for example, by a mode determination unit, which is not illustrated, using a Low Complexity Mode (high-speed mode) method. In a case where an applied prediction mode is a prediction mode for intra prediction, as shown in FIG. 1, the frame memory 125 and the intra-prediction unit 126 are connected together and the intra-prediction unit 126, the adder 114, and the adder 123 are connected together. The intra-prediction unit 126 generates an intra-predicted image on the basis of the selected prediction mode, and supplies the generated intra-predicted image to the adder 114 and the adder 123. In addition, the intra-prediction unit 126 supplies, as information on intra prediction of a macroblock for which intra prediction has been performed, information on the applied prediction mode and the like to the lossless coding unit 117.

In addition, in a case where the applied prediction mode is a prediction mode for inter prediction, although not shown in FIG. 1, the frame memory 125 and the motion estimation and compensation unit 127 are connected together and the motion estimation and compensation unit 127, the adder 114, and the adder 123 are connected together. The motion estimation and compensation unit 127 generates an inter-predicted image on the basis of the selected prediction mode, and supplies the generated inter-predicted image to the adder 114 and the adder 123. In addition, the intra-prediction unit 126 supplies, as information on inter prediction of a macroblock for which inter prediction has been performed, information on the applied prediction mode, a detected motion vector, the number of an image (picture) referred to, and the like to the lossless coding unit 117.

Figure 2:
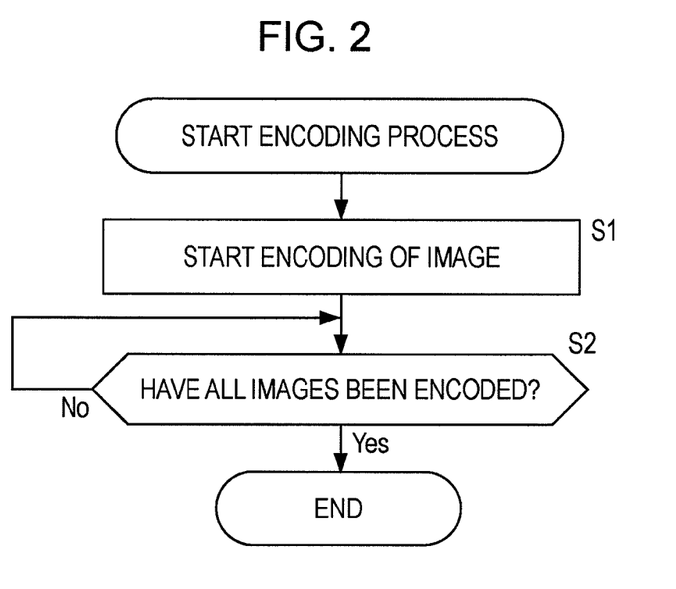
FIG. 2 is a flowchart for explaining an encoding process performed by the image processing apparatus in FIG. 1.

Next, an encoding process performed by the image processing apparatus 101 in FIG. 1 will be described with reference to a flowchart of FIG. 2. Note that this process is started, for example, when inputting of an image from the outside to the image processing apparatus 101 is started.

In step S1, the image processing apparatus 101 starts encoding of an image. That is, by start of the operations described above with reference to FIG. 1 by individual units of the image processing apparatus 101, encoding of an input image by the H.264/AVC method is started. In addition, a deblocking control process, which will be described later with reference to FIGS. 3 to 6, is also started.

In step S2, the image processing apparatus 101 determines whether all the images have been encoded. Encoding of images is performed until it is determined in step S2 that all the images input from the outside have been encoded. In a case where it is determined that all the images input from the outside have been encoded, the encoding process ends.

Next, a first embodiment of a deblocking control process performed by the image processing apparatus 101 in the process of the encoding process, which has been described above with reference to FIG. 2, will be described with reference to a flowchart of FIG. 3.

In step S21, the rate control unit 119 calculates Complexity. Specifically, the rate control unit 119 obtains an encoded image (picture) from the storage buffer 118. The rate control unit 119 calculates a coding difficulty Complexity as a feature quantity representing the complexity of the image, by using the following equation (1):

$$\text{Complexity} = \text{PictureGeneratedBis} \times \text{PictureAverageQuant} \quad (1)$$

Here, PictureGeneratedBis represents the generated code amount of the image. In addition, PictuerAverageQuant represents the average of quantizer scales applied to the image and is calculated by the following equation (2):

[Expression 1]

$$PictureAverageQuant = \frac{1}{MBNum} \sum_{k=1}^{MBNum} Quant_k \quad (2)$$

Here, MBNum represents the number of macroblocks of the image. In addition, $Quant_k$ represents a quantizer scale applied to a kth macroblock within the image and is calculated by the following equation (3):

[Expression 2]

$$Quant_k = 2^{\frac{QP_k}{6}} \qquad (3)$$

Here, QPk represents a quantization parameter of the kth macroblock within the image.

That is, Complexity calculated by equation (1) is a value obtained by multiplexing the generated code amount of the image with the average of quantizer scales. Thus, Complexity becomes smaller as the motion of an image is decreased. In addition, Complexity becomes greater as the motion of an image is increased.

In step S22, the deblocking filter 124 adjusts parameters regarding deblocking processing. Specifically, the rate control unit 119 supplies information indicating the calculated Complexity to the deblocking filter 124. The deblocking filter 124 adjusts the values of disable_deblocking_filter_idc, slice_alpha_c0_offset_div2, and slice_beta_offset_div2 in accordance with the value of Complexity of an image to be subjected to deblocking processing.

Disable_deblocking_filter_idc is a parameter for setting whether or not deblocking processing is to be applied and can be set for each slice. Disable_deblocking_filter_idc is set to 0 in a case where deblocking processing is applied, set to 1 in a case where deblocking processing is not applied, and set to 2 in a case where deblocking processing is not applied at a boundary between slices.

Slice_alpha_c0_offset_div2 is a parameter for adjusting the degree to which deblocking processing is applied to a boundary between blocks in a case where a slice is divided into blocks of 4×4 pixels and can be set for each slice. Slice_alpha_c0_offset_div2 can be set within a range from −6 to +6. As the value is decreased, the degree to which deblocking processing is applied becomes lower. As the value is increased, the degree to which deblocking processing is applied becomes higher.

Slice_beta_offset_div2 is a parameter for adjusting the degree to which deblocking processing is applied to a pixel within a block in a case where a slice is divided into blocks of 4×4 pixels and can be set for each slice. Slice_beta_offset_div2 can be set within a range from −6 to +6. As the value is decreased, the degree to which deblocking processing is applied becomes lower. As the value is increased, the degree to which deblocking processing is applied becomes higher.

In step S22, for example, in a case where Complexity is less than a predetermined threshold Thc, disable_deblocking_filter_idc is set to 1. That is, for an image in which only slight block noise is generated and very little motion occurs, deblocking processing is not applied.

In addition, for example, in a case where Complexity is equal to or more than the threshold Thc, the values of slice_alpha_c0_offset_div2 and slice_beta_offset_div2 are adjusted in accordance with the value of Complexity. For example, as the value of Complexity becomes smaller, slice_alpha_c0_offset_div2 and slice_beta_offset_div2 are set to values nearer to −6. In addition, as the value of Complexity becomes greater, slice_alpha_c0_offset_div2 and slice_beta_offset_div2 are set to values nearer to +6. That is, for an image in which block noise is less likely to be generated and a small amount of motion occurs, the degree to which deblocking processing is applied is decreased. In addition, for an image in which block noise is more likely to be generated and a great amount of motion occurs, the degree to which deblocking processing is applied is increased.

In step S23, the deblocking filter 124 performs deblocking processing, and the deblocking control process ends. A decoded image that has been subjected to deblocking processing is stored as a reference image in the frame memory 125. Note that in a case where disable_deblocking_filter_idc is set to 1, deblocking processing is not performed.

As described above, in accordance with Complexity, deblocking processing is properly performed on a decoded image, and a reference image from which block noise has been removed is generated while texture is maintained. Thus, the image quality of an image that is subjected to inter-prediction coding by using the reference image can be improved.

Note that the value of the threshold Thc may be changed in accordance with the type of image, that is, in accordance with whether the image is an I-picture, a P-picture, or a B-picture.

In addition, the coding difficulties of a P-picture and a B-picture, which are images encoded by using inter-frame prediction, may be normalized by using Complexity of an I-picture, which is an image encoded by using intra-frame prediction prior to the image, and deblocking processing may be controlled on the basis of the normalized values (Norm_Complexity). Norm_ComplexityPpic, which is obtained by normalizing Complexity of a P-picture, and Norm_ComplexityBpic, which is obtained by normalizing Complexity of a B-picture, are calculated by the following equations (4) to (8):

$$ComplexityIpic = PictureGeneratedBisIpic \times PictureAverageQuantIpic \qquad (4)$$

$$ComplexityPpic = \qquad (5)$$
$$PictureGeneratedBisPpic \times PictureAverageQuantPpic$$

$$ComplexityBpic = \qquad (6)$$
$$PictureGeneratedBisBpic \times PictureAverageQuantBpic$$

$$\text{Norm\_ComplexityPpic} = ComplexityPpic \div ComplexityIpic \qquad (7)$$

$$\text{Norm\_ComplexityBpic} = ComplexityBpic \div ComplexityIpic \qquad (8)$$

Note that ComplexityIpic, PictureGeneratedBisIpic, and PictureAverageQuantIpic represent the coding difficulty, the generated code amount, and the average of quantizer scales of an I-picture, respectively. In addition, ComplexityPpic, PictureGeneratedBisPpic, and PictureAverageQuantPpic represent the coding difficulty, the generated code amount, and the average of quantizer scales of a P-picture, respectively. In addition, ComplexityBpic, PictureGeneratedBisBpic, and PictureAverageQuantlBic represent the coding difficulty, the generated code amount, and the average of quantizer scales of a B-picture, respectively.

For example, in a case where an image to be subjected to deblocking processing is a P-picture or a B-picture, if Norm_Complexity is less than a predetermined threshold Thcn, disable_deblocking_filter_idc is set to 1. That is, for an image in which only slight block noise is generated and very little motion occurs, deblocking processing is not applied.

In addition, for example, in a case where Norm_Complexity is equal to or more than the threshold Thcn, the values of slice_alpha_c0_offset_div2 and slice_beta_offset_div2 are adjusted in accordance with the value of Norm_Complexity. For example, as the value of Norm_Complexity becomes smaller, slice_alpha_c0_offset_div2 and slice_beta_offset_div2 are set to values nearer to −6. In addition, as the value of Norm_Complexity becomes greater, slice_alpha_c0_offset_div2 and slice_beta_offset_div2 are set to values nearer to +6. That is, for an image in which block noise is less likely to be generated and a small amount of motion occurs, the degree to which deblocking processing is applied is decreased. In addition, for an image in which block noise is more likely to be generated and a great amount of motion occurs, the degree to which deblocking processing is applied is increased.

Since Norm_ComplexityPpic and Norm_ComplexityBpic represent the motion of a P-picture and a B-picture in a case where the motion of an I-picture is set to 1 and the complexity of the motion of each picture can thus be extracted more accurately, deblocking processing can be performed more properly. Thus, the image quality of an image that is subjected to inter-prediction coding can be further improved.

Note that the value of the threshold Thcn may be changed in accordance with the type of image, that is, in accordance with whether the image is a P-picture or a B-picture.

In addition, it is preferable that an I-picture to be used for normalization be an I-picture that was most recently encoded prior to the image or an I-picture referred to in encoding of the image.

In addition, for an I-picture, deblocking processing is controlled on the basis of Complexity, as described above.

Next, a second embodiment of a deblocking control process performed by the image processing apparatus 101 in the process of the encoding process, which has been described above with reference to FIG. 2, will be described with reference to a flowchart of FIG. 4.

In step S41, the activity calculation section 141 calculates Activity. Specifically, the activity calculation section 141 calculates Activity as a feature quantity representing the complexity of an image to be encoded, by using the following equation (9):

[Expression 3]

$$\text{Activity} = \frac{1}{MBNum} \sum_{k=1}^{MBNum} act_k \quad (9)$$

Here, $act_k$ represents the activity of a kth macroblock of the image and is calculated by the following equation (10):

[Expression 4]

$$act_k = 1 + \min_{sblk=1,8}(\text{var}\, sblk) \quad (10)$$

Here, one macroblock is divided into four sub-blocks formed by 8×8 pixels and var sblk represents a value indicating dispersion of pixel values of a divided sub-block and is calculated by the following equations (11) and (12):

[Expression 5]

$$\text{var}\, sblk = \frac{1}{64} \sum_{k=1}^{64} (P_k - \overline{P})^2 \quad (11)$$

$$\overline{P} = \frac{1}{64} \sum_{k=1}^{64} P_k \quad (12)$$

Here, $P_k$ represents the pixel value of a kth pixel within a sub-block.

In addition, var sblk is obtained for each sub-block in two cases, a frame DCT encoding mode and a field DCT encoding mode, and minsblk=1,8(var sblk) in equation (10) represents the minimum value of the obtained var sblk.

That is, Activity calculated by equation (9) is an average of the activities of individual macroblocks in the image and is a value, for example, to be used for rate control defined by MPEG-2 TestModel 5 (TM5). Thus, Activity becomes smaller as a change in pixel values is decreased. In addition, Activity becomes greater as a change in pixel values is increased.

In step S42, the deblocking filter 124 adjusts parameters regarding deblocking processing. Specifically, the activity calculation section 141 supplies information indicating the calculated Activity to the deblocking filter 124. The deblocking filter 124 adjusts the values of disable_deblocking_filter_idc, slice_alpha_c0_offset_div2, and slice_beta_offset_div2 in accordance with the value of Activity of an image to be subjected to deblocking processing.

For example, in a case where Activity is less than a predetermined threshold Tha, disable_deblocking_filter_idc is set to 1. That is, for a plain image in which only slight block noise is generated and a very small amount of change occurs in pixel values, deblocking processing is not applied.

In addition, for example, in a case where Activity is equal to or more than the threshold Tha, the values of slice_alpha_c0_offset_div2 and slice_beta_offset_div2 are adjusted in accordance with the value of Activity. For example, as the value of Activity becomes smaller, slice_alpha_c0_offset_div2 and slice_beta_offset_div2 are set to values nearer to −6. In addition, as the value of Activity becomes greater, slice_alpha_c0_offset_div2 and slice_beta_offset_div2 are set to values nearer to +6. That is, for an image in which block noise is less likely to be generated and a small amount of change occurs in pixel values, the degree to which deblocking processing is applied is decreased. In addition, for a complicated image in which block noise is more likely to be generated and a great amount of change occurs in pixel values, the degree to which deblocking processing is applied is increased.

Figure 3:
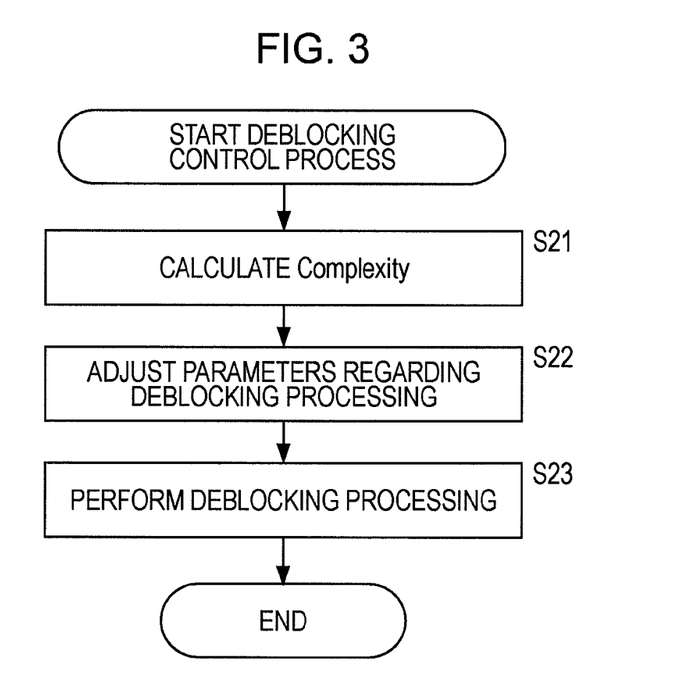
FIG. 3 is a flowchart for explaining a first embodiment of a deblocking control process performed by the image processing apparatus in FIG. 1.

In step S43, as in the above-described processing of step S23 in FIG. 3, deblocking processing is performed, and the deblocking control process ends.

As described above, in accordance with Activity, deblocking processing is properly performed on a decoded image, and a reference image from which block noise has been removed is generated while texture is maintained. Thus, the image quality of an image that is subjected to inter-prediction coding by using the reference image can be improved.

In addition, in a case where Activity is used, before an image is encoded, a feature quantity representing the complexity of the image can be obtained.

Furthermore, as described above, since Activity is a value used in rate control defined by MPEG-2 TestModel 5 (TM5), for example, Activity can be calculated by the rate control unit 119.

In addition, instead of the above-described Activity, that is, the average of the activities of individual macroblocks, a value reflecting the size of dispersion of pixel values of the image, such as, for example, the total value of the activities of the individual macroblocks, may be used.

A third embodiment of a deblocking control process performed by the image processing apparatus 101 in the process of the encoding process, which has been described above with reference to FIG. 2, will be described with reference to a flowchart of FIG. 5.

In step S61, the orthogonal transformation section 142 calculates the total sum of orthogonal transformation coefficients. Specifically, the orthogonal transformation section 142 divides an image to be encoded into blocks having a predetermined size. Note that, hereinafter, an example in which division into blocks of 4×4 pixels is performed and Hadamard transform is employed as orthogonal transformation will be described. The orthogonal transformation section 142 performs Hadamard transform of each block by using the following equation (13):

$$P' = H T P H \quad (13)$$

Here, P represents a pixel matrix of 4×4 pixels before Hadamard transform is performed, and P' represents a matrix of 4×4 transformation coefficients after Hadamard transform is performed. In addition, H represents a fourth-order Hadamard matrix represented by the following equation (14), and HT represents a transposed matrix of a fourth-order Hadamard matrix.

[Expression 6]

$$H_4 = \frac{1}{\sqrt{4}} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (14)$$

The orthogonal transformation section 142 calculates, for each block, the sum Ph of the absolute values of transformation coefficients other than a transformation coefficient of coordinates (0,0) of the transformation coefficient matrix P' (a transformation coefficient of a DC (direct-current) component). That is, Ph represents the sum of the absolute values of transformation coefficients of AC (alternating-current) components that are correlated with respect to the code amount from among transformation coefficients within a block after Hadamard transform is performed. Furthermore, the orthogonal transformation section 142 calculates the total sum DCtotal of Ph of the entire blocks in the image. Note that a smaller DCtotal is obtained as an image becomes simpler, in which frequency components are concentrated. In addition, a larger DCtotal is obtained as an image becomes complicated, in which frequency components are dispersed.

In step S62, the deblocking filter 124 adjusts parameters regarding deblocking processing. Specifically, the orthogonal transformation section 142 supplies information indicating the calculated DCtotal to the deblocking filter 124. The deblocking filter 124 adjusts the values of disable_deblocking_filter_idc, slice_alpha_c0_offset_div2, and slice_beta_offset_div2 in accordance with the value of DCtotal of an image to be subjected to deblocking processing.

For example, in a case where DCtotal is less than a predetermined threshold Thd, disable_deblocking_filter_idc is set to 1. That is, for a very simple image in which only slight noise is generated and frequency components are concentrated, deblocking processing is not applied.

In addition, for example, in a case where DCtotal is equal to or more than the threshold Thd, the values of slice_alpha_c0_offset_div2 and slice_beta_offset_div2 are adjusted in accordance with the value of DCtotal. For example, as the value of DCtotal becomes smaller, slice_alpha_c0_offset_div2 and slice_beta_offset_div2 are set to values nearer to −6. In addition, as the value of DCtotal becomes greater, slice_alpha_c0_offset_div2 and slice_beta_offset_div2 are set to values nearer to +6. That is, for a simple image in which block noise is less likely to be generated and frequency components are concentrated, the degree to which deblocking processing is applied is decreased. In addition, for a complicated image in which block noise is more likely to be generated and frequency components are dispersed, the degree to which deblocking processing is applied is increased.

In step S63, as in the above-described processing of step S23 in FIG. 3, deblocking processing is performed, and the deblocking control process ends.

Note that, although in the above description, an example in which Hadamard transform is employed as orthogonal transformation has been described, other types of orthogonal transformation, such as, for example, DCT (discrete cosine transform), may be employed.

In addition, irrespective of the type of orthogonal transformation, the sizes of blocks to be obtained by division are not limited to the above-described 4×4 pixels. For example, the sizes of the blocks can be set to desired sizes, such as, for example, 8×8 pixels.

As described above, in accordance with DCtotal, deblocking processing is properly performed on a decoded image, and a reference image from which block noise has been removed is generated while texture is maintained. Thus, the image quality of an image that is subjected to inter-prediction coding by using the reference image can be improved.

In addition, since DCtotal is the total sum of transformation coefficients resolved into frequency components by application of orthogonal transformation, the correlation with respect to the coding difficulty of the image is increased. Thus, the complexity of an image can be expressed with a high accuracy compared to Activity.

Furthermore, in a case where DCtotal is used, before an image is encoded, a feature quantity representing the complexity of the image can be obtained.

In addition, instead of the orthogonal transformation section 142, by using the orthogonal transformation unit 115, orthogonal transformation coefficients can be calculated.

Furthermore, instead of the above-described DCtotal, that is, the total sum of orthogonal transformation coefficients of AC components, values reflecting the sizes of the orthogonal transformation coefficients of the AC components of the image, such as, for example, the average of the orthogonal transformation coefficients of the AC components, may be used.

A fourth embodiment of a deblocking control process performed by the image processing apparatus 101 in the process of the encoding process, which has been described above with reference to FIG. 2, will be described with reference to a flowchart of FIG. 6.

In step S81, the prediction error addition unit 120 calculates the total sum of prediction errors. Specifically, in a case where an image to be encoded, that is, an image for which a difference is calculated by the adder 114, is a P-picture or a B-picture, the prediction error addition unit 120 adds, for one picture, prediction errors supplied from the adder 114. Thus, the total sum Et of the prediction errors is calculated. Note that, the more easily the motion of an image is predicted, that is, the smaller and simpler the motion of the image is, the smaller Et is. In addition, the more difficultly the motion of an image is predicted, that is, the greater and more complicated the motion of the image is, the greater Et is.

In step S82, the deblocking filter 124 adjusts parameters regarding deblocking processing. Specifically, the prediction error addition unit 120 supplies, to the deblocking filter 124, information indicating the calculated total sum Et of the prediction errors. The deblocking filter 124 adjusts the values of disable_deblocking_filter_idc, slice_alpha_c0_offset_div2, and slice_beta_offset_div2 in accordance with the value of Et.

For example, in a case where Et is less than a predetermined threshold The, disable_deblocking_filter_idc is set to 1. That is, for an image in which only slight block noise is generated and very little motion occurs, deblocking processing is not applied.

In addition, for example, in a case where Et is equal to or more than the threshold The, the values of slice_alpha_c0_offset_div2 and slice_beta_offset_div2 are adjusted in accordance with the value of Et. For example, as the value of Et becomes smaller, slice_alpha_c0_offset_div2 and slice_beta_offset_div2 are set to values nearer to −6. In addition, as the value of Et becomes greater, and slice_beta_offset_div2 are set to values nearer to +6. That is, for a simple image in which block noise is less likely to be generated and a small amount of motion occurs, the degree to which deblocking processing is applied is decreased. In addition, for a complicated image in which block noise is more likely to be generated and a great amount of motion occurs, the degree to which deblocking processing is applied is increased.

In step S83, as in the above-described processing of step S23 in FIG. 3, deblocking processing is performed, and the deblocking control process ends.

As described above, in accordance with Et, deblocking processing is properly performed on a decoded image, and a reference image from which block noise has been removed is generated while texture is maintained. Thus, the image quality of an image that is subjected to inter-prediction coding by using the reference image can be improved.

In addition, in a case where Et is used, before an image is encoded, a feature quantity representing the complexity of the image can be obtained.

Furthermore, instead of the above-described Et, that is, the total sum of prediction errors, values reflecting the sizes of the prediction errors for the image, such as, for example, the average of orthogonal transformation coefficients, may be used.

As described above, in accordance with the feature of an image, deblocking processing can be performed properly. As a result, the subjective image quality of the image can be improved.

Note that, although in the above description, an example in which any one of Complexity, Activity, DCtotal, and Et is individually used so that the values of disable_deblocking_filter_idc, slice_alpha_c0_offset_div2, and slice_beta_offset_div2 can be adjusted has been described, the complexity of the image may be determined by using a plurality of values so that the values of disable_deblocking_filter_idc, slice_alpha_c0_offset_div2, and slice_beta_offset_div2 can be adjusted on the basis of the result.

In addition, although in the above description, an example in which encoding is performed by the H.264/AVC method has been described, the present invention is also applicable to a case where encoding is performed by an encoding method using an in-loop deblocking filter, such as, for example, an MPEG-4 (Moving Picture Coding Experts Group phase 4) or VC-1 (Video Codec 1) method.

The above-described series of processing can be performed by hardware or software. In a case where the series of processing is performed by software, a program constituting the software is installed from a program recording medium into a computer built in dedicated hardware or, for example, a general-purpose personal computer capable of performing various functions on the basis of various programs installed thereon.

Figure 7:
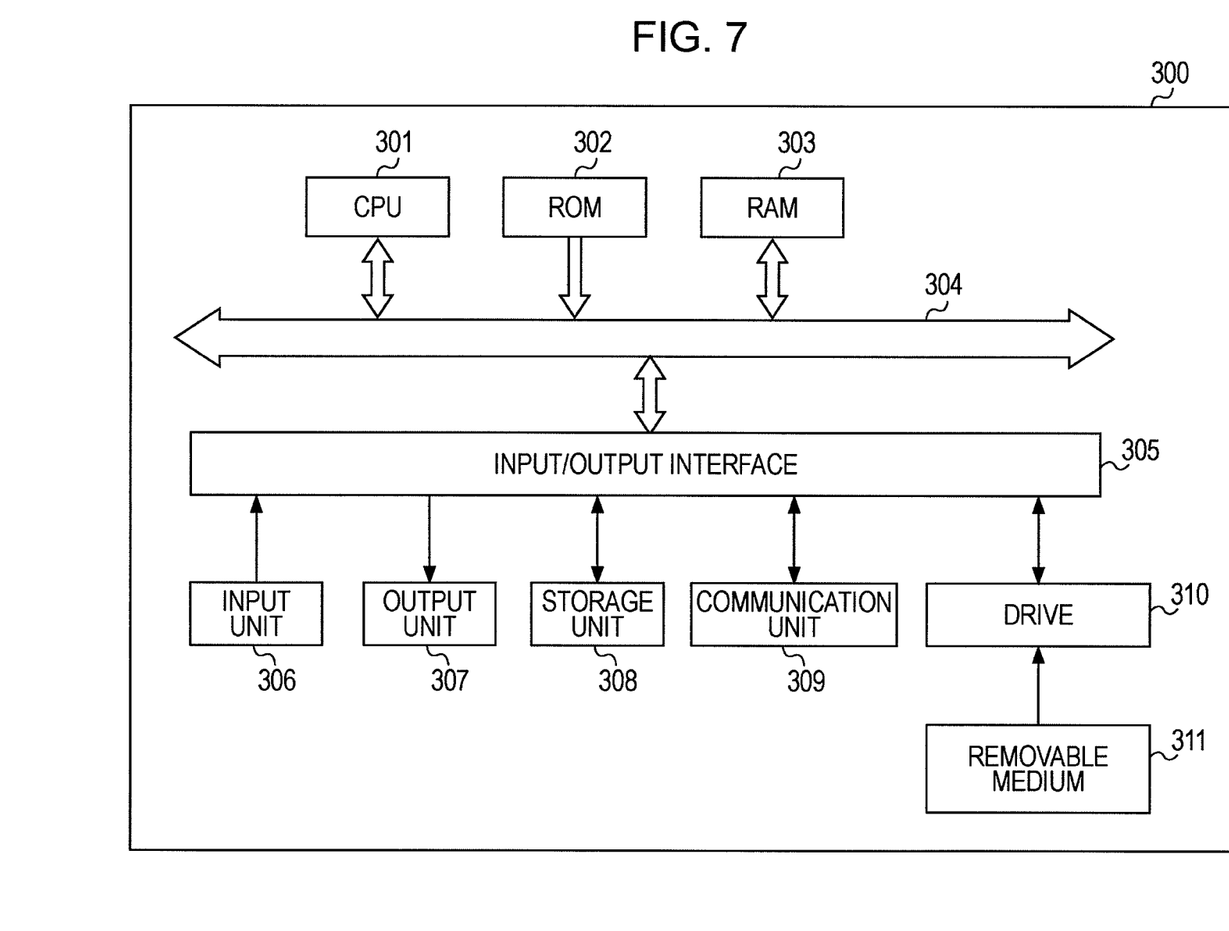
FIG. 7 is a block diagram showing an example of the configuration of a personal computer.

FIG. 7 is a block diagram showing an example of the configuration of a personal computer 300 that performs the above-described series of processing by a program. A CPU (Central Processing Unit) 301 performs various types of processing in accordance with a program stored in a ROM (Read Only Memory) 302 or a recording unit 308. A program to be performed by the CPU 301, data, and the like are stored in a RAM (Random Access Memory) 303, where appropriate. The CPU 301, the ROM 302, and the RAM 303 are connected to each other via a bus 304.

An input/output interface 305 is connected to the CPU 301 through the bus 304. An input unit 306 constituted by a keyboard, a mouse, a microphone, and the like and an output unit 307 constituted by a display, a speaker, and the like are connected to the input/output interface 305. The CPU 301 performs various types of processing in accordance with instructions input by the input unit 306. The CPU 301 outputs a processing result to the output unit 307.

The recording unit 308 connected to the input/output interface 305 is constituted by, for example, a hard disk. The recording unit 308 stores a program to be performed by the CPU 301 and various data. A communication unit 309 communicates with an external apparatus via a network, such as the Internet or a local area network.

In addition, a program may be obtained through the communication unit 309 and stored in the recording unit 308.

When a removable medium 311, such as a magnetic disk, an optical disk, a magneto-optical disk, or a semiconductor memory, is installed in a drive 310 connected to the input/output interface 305, the drive 310 drives the removable medium 311 and obtains a program and data recorded in the removable medium 311. The obtained program and data are transferred to and stored in the recording unit 308 when necessary.

A program recording medium that is installed on a computer and that stores a program executable by the computer is constituted by the removable medium 311, which is a package medium, such as a magnetic disk (including a flexible disk), an optical disk (including a CD-ROM (Compact Disc-Read Only Memory) or a DVD (Digital Versatile Disc)), a magneto-optical disk, or a semiconductor memory, the ROM 302 in which a program is temporarily or permanently stored, or the hard disk forming the recording unit 308, as shown in FIG. 7. A program is stored into the program recording medium by using a wired or wireless communication medium, such as a local area network, the Internet, or digital satellite broadcasting, via the communication unit 309, which is an interface, such as a router or a modem, when necessary.

Note that in this specification, steps describing a program stored in the program recording medium include not only processing performed in time series in accordance with the written order but also processing performed in parallel or independently, the processing being not necessarily performed in time series.

Furthermore, an embodiment of the present invention is not limited to the above-described embodiments, and various changes can be made without departing from the gist of the present invention.

The invention claimed is:

1. An image processing apparatus comprising:
a deblocking filter that performs deblocking processing on a decoded image obtained by decoding a second image that is used for motion estimation of a first image in a case where the first image is encoded and that is encoded prior to the first image; and
a feature quantity calculation unit configured to calculate a feature quantity representing the complexity of the second image, the feature quantity being obtained based on a generated code amount of the second image and an average of quantizer scales applied to the second image, wherein the deblocking filter controls whether or not the deblocking processing is to be applied to the decoded image or controls the degree to which the deblocking processing is to be applied to the decoded image, on the basis of the feature quantity.

2. The image processing apparatus according to claim 1, wherein the feature quantity calculation unit is configured to calculate a coding difficulty of the second image as the feature quantity.

3. The image processing apparatus according to claim 2, wherein in a case where the second image is an image encoded by using inter-frame prediction, the feature quantity calculation unit is configured to set, as the feature quantity, a value obtained by normalizing the coding difficulty of the second image by using a coding difficulty of a third image encoded by using intra-frame prediction prior to the encoding of the second image.

4. The image processing apparatus according to claim 1, wherein the feature quantity calculation unit is configured to divide the second image that has not been encoded into a plurality of blocks, and to calculate the feature quantity on the basis of dispersion of pixel values for each of the blocks.

5. The image processing apparatus according to claim 1, wherein the feature quantity calculation unit is configured to divide the second image that has not been encoded into a plurality of blocks, and to calculate the feature quantity on the basis of a transformation coefficient obtained by performing orthogonal transformation for each of the blocks.

6. The image processing apparatus according to claim 1, wherein the feature quantity calculation unit is configured to calculate the feature quantity on the basis of a prediction error, which is a difference between a predicted image for the second image predicted by inter-frame prediction and the second image that has not been encoded.

7. The image processing apparatus according to claim 1, wherein an image is encoded by an H.264/AVC (Advanced Video Coding) method, and wherein the deblocking filter controls whether or not the deblocking processing is to be applied to the decoded image or controls the degree to which the deblocking processing is to be applied to the decoded image, by adjusting a value of disable_deblocking_filter_idc, slice_alpha_c0_offset_div2, or slice_beta_offset_div2.

8. The image processing apparatus according to claim 1, wherein an image is encoded by an MPEG-4 (Moving Picture Coding Experts Group phase 4), H.264/AVC (Advanced Video Coding), or VC-1 (Video Codec 1) method.

9. An image processing method comprising the steps of:

calculating a feature quantity representing the complexity of a second image that is used for motion estimation of a first image in a case where the first image is encoded and that is encoded prior to the first image, the feature quantity being obtained based on a generated code amount of the second image and an average of quantizer scales applied to the second image; and controlling whether or not deblocking processing is to be applied to a decoded image obtained by decoding the second image or controlling the degree to which the deblocking processing is to be applied to the decoded image, on the basis of the feature quantity.

10. A non-transitory computer-readable recording medium storing a commuter program that when executed on a computer performs image processing, the program comprising the steps of:

calculating a feature quantity representing the complexity of a second image that is used for motion estimation of a first image in a case where the first image is encoded and that is encoded prior to the first image, the feature quantity being obtained based on a generated code amount of the second image and an average of quantizer scales applied to the second image; and controlling whether or not deblocking processing is to be applied to a decoded image obtained by decoding the second image or controlling the degree to which the deblocking processing is to be applied to the decoded image, on the basis of the feature quantity.

* * * * *